United States Patent [19]

Kinoshita et al.

[11] Patent Number: 5,109,272
[45] Date of Patent: Apr. 28, 1992

[54] METHOD OF SUPERIMPOSING COLOR IMAGES AND COLOR IMAGE PROCESSING APPARATUS

[75] Inventors: Kazunori Kinoshita, Odawara; Hidefumi Masuzaki; Tsugio Takahashi, both of Hadano; Tatsuya Sakamoto, Odawara; Tatsuya Murakami, Tachikawa; Yasuo Kurosu, Yokosuka, all of Japan

[73] Assignee: Hitachi, Ltd., Tokyo, Japan

[21] Appl. No.: 627,817

[22] Filed: Dec. 14, 1990

[30] Foreign Application Priority Data

Dec. 15, 1989 [JP] Japan .................... 1-324930

[51] Int. Cl.⁵ .............................. H04N 9/75
[52] U.S. Cl. ........................ 358/75; 358/22
[58] Field of Search ............ 358/75, 80, 82, 22, 358/183

[56] References Cited

U.S. PATENT DOCUMENTS 3,995,312 11/1976 Hubbard, Jr. et al. ............ 358/81
4,789,854 12/1988 Ishii ..................................... 358/22
4,908,700 3/1990 Ishii et al. ......................... 358/183

Primary Examiner—Stephen Brinich
Attorney, Agent, or Firm—Antonelli, Terry, Stout & Kraus

[57] ABSTRACT

A method of superimposing and displaying a color image expressed by color code data and a color image expressed by three primary color dot data comprises the steps of converting the color code data into three primary color density data while converting the three primary color dot data into density data which are in the same form as the three primary color density data, and selectively displaying one of the two density data for each pixel on a display screen. Thus, two types of color image data, i.e., color code data and three primary color dot data are allowed to be handled in the same way and to be superimposed on a color display. This is useful in a color image filing system based on a workstation. In transferring the two types of color image data to a printer, the two image data are combined in memories and transferred to the printer as dot data through the existing printer interface. At the printer, the combined image data is divided into the previous two types of image data and printed in the same manner as in the display action.

9 Claims, 7 Drawing Sheets

FIG. 7

| A24 | A23 | A22 | A21 | A20 |
|---|---|---|---|---|
| A19 | A18 | A17 | A16 | A15 |
| A14 | A13 | A12 | A11 | A10 |
| A9 | A8 | A7 | A6 | A5 |
| A4 | A3 | A2 | A1 | A0 |

MATRIX A

| 1 | 2 | 4 | 2 | 1 |
|---|---|---|---|---|
| 2 | 4 | 8 | 4 | 2 |
| 4 | 8 | 16 | 8 | 4 |
| 2 | 4 | 8 | 4 | 2 |
| 1 | 2 | 4 | 2 | 1 |

MATRIX B $$\begin{pmatrix} \text{ELEMENT OF MATRIX A}: a_{ij} \\ \text{ELEMENT OF MATRIX B}: b_{ij} \end{pmatrix}$$

DENSITY AT CENTRAL ELEMENT A12
OF MATRIX A (100 GRAY SCALES) $= \sum_{i=0}^{4} \sum_{j=0}^{4} a_{ij} \cdot b_{ij}$

METHOD OF SUPERIMPOSING COLOR IMAGES AND COLOR IMAGE PROCESSING APPARATUS

BACKGROUND OF THE INVENTION

1. Field of the Invention

This invention relates to an apparatus for processing color images using two types of color image data, i.e., dot data and color code data, and particularly to a color image processing apparatus and a color printing apparatus suitable for color display and printing.

2. Description of the Related Art (1) Heretofore, dither image is known as psudo-expression of half-tone image on a monochromatic binary display device, i.e., expression of light and shade image in dot data, as disclosed Kamae and Fukinuki, "Digital Image Communication" Sangyo Tosho, p.44.

(2) Moreover, among conventional techniques for separating color image into brightness data and color data and for transmitting the brightness data in run length coding and color data in color code, there is the CAPTAIN system. The CAPTAIN system is disclosed in an article entitled "Pattern Data and Coloring Unit in CAPTAIN" in page 132 of the above mentioned book.

(3) Furthermore, among prior arts for converting a plurality of color praphic data into raster data in a workstation and for superimposing them in a color printer, there is a color image recording apparatus as disclosed in Japanese Laid-open Patent Application (KOKAI) No. 64-68064.

The dither image described above is an area gradation expression by numbers of dots in a monocharomatic binary display apparatus and thus does not require input of multi-valued data of three primary colors (R,G,B) such as input signals in full color CRT display device and printing devices.

Moreover, in the above CAPTAIN the brightness data and color data are expressed in two types of transmitting codes. Therefore, it is possible to transmit the brightness data and color data in the form of dot data.

Furthermore, in the prior art as disclosed in the above Japanese Laid-open Patent Application, the processing for forming raster data (scanning line signals consisting of multi-valued or analogue signals) from a plurality of color graphic data is performed at the side of host. However, this prior art neither discloses nor suggests that dot data is transmitted transmitting as data between the host and a printer.

SUMMARY OF THE INVENTION

Generally, if the multi-valued data of three primary colors of color image data for color image processing are used when being stored or transmitted, there would be caused problems that increased capacity of memory is required and transmission speed is lowered. For these reasons, it will be desirable to store and transmit color image data in binary data (dot data) expressed by dither in three primary colors. On the other hand, in many cases, image data for color display are in the form of color code suitable for displaying data in the work station. For this reason, display image data in a color image processing apparatus having a workstation include two types of color data, i.e., dot data and color code data. This would cause problems that increased capacity of memory is required and transmission speed is lowered if separately processed when being stored or transmitted. Therefore, it will be convenient to store and transmit display image data in the form of the above mentioned binary data.

An object of this invention is to provide a method of simultaneously handling two types of color data, i.e., dot data and color code data and of superimposing and displaying on a single color display device.

Another object of this invention is to provide a color image processing apparatus and a color printing apparatus comprising means for converting the two types of dot color data into multi-valued signals of three primary colors when being displayed or printed.

A still another object of this invention is to provide a color image transferring method, a color image processing apparatus and a color printing apparatus capable of processing the two types of color data in the form of dot data when being transmitted or stored.

According to an aspect of the invention, there is provided a method of superimposing and displaying a color image expressed by color code data and a color image expressed by three primary color dot data, comprising the steps of converting the color code data into three primary color density data while converting the three primary color dot data into density data which are in the same form as the three primary color density data, and selectively displaying one of the two density data for each pixel on a display screen.

According the another aspect of this invention, there is provided a method of simultaneously transferring a color image expressed by color code data and a color image expressed by three primary color dot data to a device of destination, comprising the steps of providing an image memory for storing a color image having a size lager than the color image, storing multi-bit data corresponding to each pixel of the color code data and dot data as a plunality of pixels in the image memory, feeding data stored in the image memory to the device of destination as dot data, and separating the color code data and the three primary color dot data from each other in the device of destination.

In the color image transferring method, the multi-bit data corresponding to the each pixel preferably include selecting data to indicate which of the color code data or the three primary color dot data should be selected for the pixel.

According to another aspect of this invention, there is provided a color image processing apparatus for processing and displaying color images, comprising a first image memory means for storing a color image as three primary color dot data, a second image memory means for storing a color image as color code data, means for calculating density data for each of three primary colors on the basis of dot density of the three primary dot data stored in the first image memory means, means for converting the color code data stored in the second image memory means into density data for each of three primary color, and means for selecting and feeding either of the two density data for each of three primary colors to a color displaying device.

The color image processing apparatus may further comprise a third image memory means for storing three primary color dot data stored in the first image memory means and color code data stored in the second image memory means together with selecting data to indicate which of the three primary color dot data and the color code data should be selected for each pixel, and means for reading out data stored in the third image memory means as dot data and sending them to a color printing device.

According to another aspect of this invention, there is provided a color printing apparatus comprising a printer image memory means for receiving and storing the data stored in the third image memory means as three primary color dot data, means for separating the data stored in the printer image memory means into dot data, color code data and selecting data, means for calculating density data for each of three primary colors on the basis of dot density of the separated dot data, means for converting the separated color code data into density data for each of three primary colors, and means for selecting and outputting either of the two density data for each of three primary colors on the basis of the separated selecting data.

According to another aspect of this invention, there is provided a color image processing apparatus for processing and displaying color images, comprising a first image memory means for storing brightness information of a color image as dot data, a second image memory means for storing color information of a color image as color code data, means for calculating brightness data on the basis of dot density of the dot data stored in the first image memory means, means for converting the color code data stored in the second image memory means into color data, and means for converting the brightness data and the color data into density data for each of three primary colos and feeding them to a color displaying device.

The above color image processing apparatus may further comprise a third image memory means for storing the dot data stored in the first image memory means and the color code data stored in the second image memory means in association with each other, and means for reading out the data stored in the third image memory means as dot data and sending them to a color printing device.

According to another aspect of this invention, there is provided a color printing device as connected to the above color image processing apparatus, comprising a printer image memory means for receiving and storing the data stored in the third image memory means as dot data, means for separating the data stored in the printer image memory means into dot data and color code data, means for calculating brightness data on the basis of dot density of the separated dot data, means for converting the separated color code data into color data, and means for converting the brightness data and the color data into density data for each of three primary colors and feeding them to a color printing section.

In the color image processing apparatus of this invention, display data outputted to a color displaying device is unified into an identical form of data (density data for three primary colors) so that two types of color image data, i.e., color code data and three primary color dot data can be handled in the same manner, superimposed and displayed on an identical color display. Incidentally, three primary dot data and three primary density data are different from each other in that each color data of the former is binary data while each color data of the latter is multivalued data.

In order to unify an output form of color data, dot data are developed into (n×n) matrix in two-dimension and dot density is calculated in the (n×n) matrix size, thereby obtaining multivalued outputs for three primary colors. On the other hand, for color code data, a dictionary of color code (look-up table: hereinafter referred to as LUT) is loaded into the memory by means of the work station, and multivalued outputs for three primary colors are obtained by referring to the memory in association with each color code. In this manner, two types of color data are uniformalized into an identical output form and then can be superimposed and displayed on the same color display device.

When transferring such image data of two types to a color printing device, since line density of display image data is lower than that of general image data (image data produced by a scanner or the like), dot data and color code data of display image data are first written into image area (for example, image areas for three planes of RGB) of a memory which is simultaneously accessible with double line density, and then read-out data are transmitted in the same form as they are. At the destination of the transmission they are separated into dot data and color code data based on their order of writing to the memory. Thus, image data of two different types can be simultaneously transmitted to a printing device by use of an existing printer interface.

This invention will now be described in further detail with regard to preferred embodiments as illustrated in the accompanying drawings.

BRIEF DESCRIPTION OF THE DRAWINGS

FIG. 7 is a diagram for explaining a method of calculating density on the basis of dot data;

DESCRIPTION OF THE PREFERRED EMBODIMENTS

Figure 1:
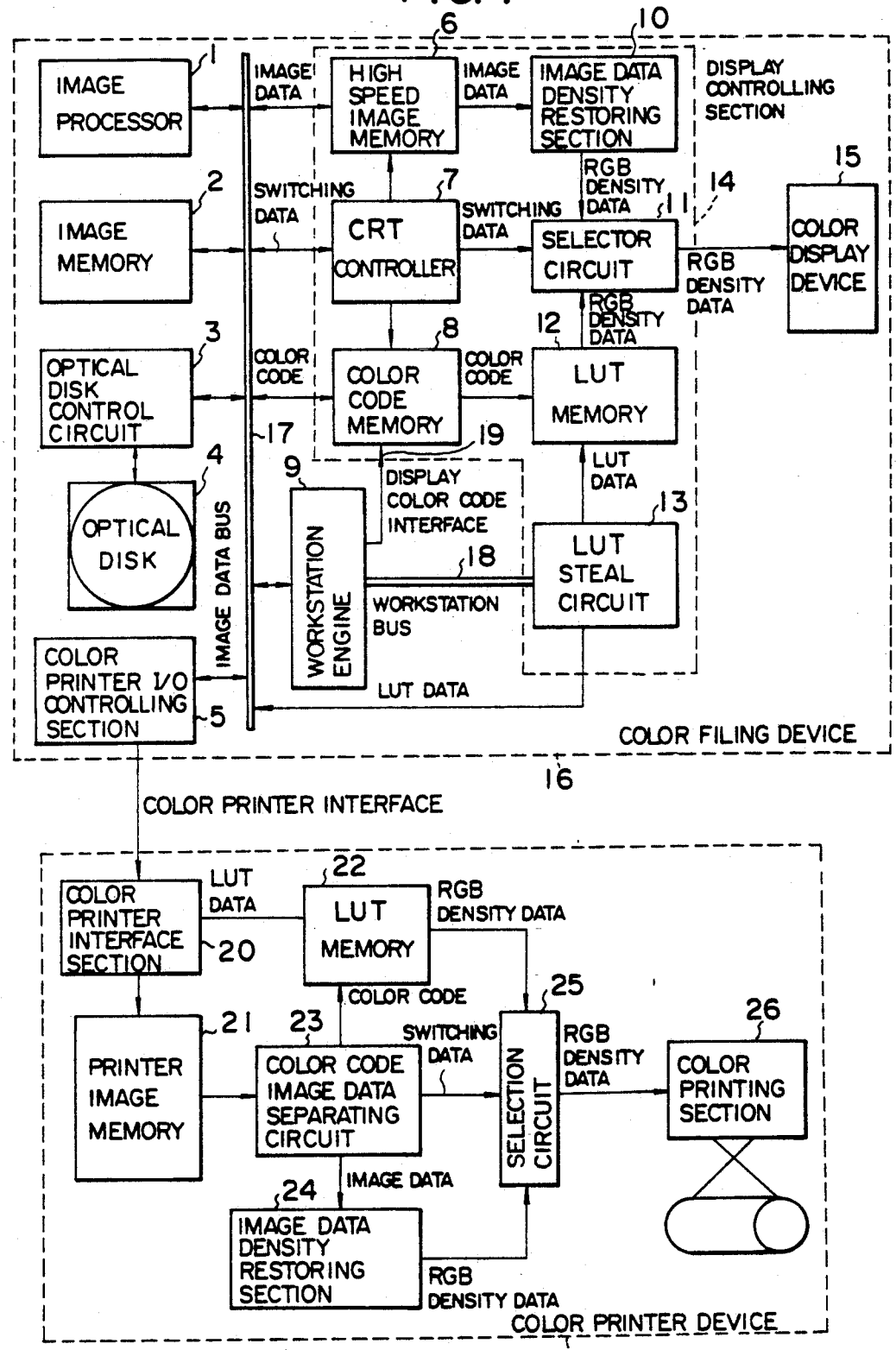
FIG. 1 is a block diagram showing a color filing device and a color printing device for illustrating an embodiment of this invention.

Referring now to FIG. 1, there is shown a block diagram of a system according to an embodiment of this invention.

This system comprises a color filing device 16 and a color printing device 27. The color filing device 16 comprises an image processor 1, an image memory 2, an optical disk control circuit 3, an optical disk 4, a color printer I/O controlling section 5, a workstation engine 9, a display controlling section 14 and a color display device 15. The color display controlling section 14 further comprises a high speed image memory 6, a CRT controller 7, a color code memory 8, an image data density restoring section 10, a selector circuit 11, an LUT memory 12 and an LUT steal circuit 13.

The color printing device 27 comprises a color printer interface section 20, a printer image memory 21, an LUT memory 22, a color code image data separating circuit 23, an image data restoring section 24, a selection circuit 25 and a color printing section 26.

Image data stored in the optical disk 4 are read out by the optical disk controlling circuit 3 and then decoded by the image processor 1 and stored in the image memory 2 in the form of dot data. The image processor 1 performs various image processing for the dot data (hereinafter referred to as image data) according to job program of the workstation engine 9. The image data processed are transferred to the high speed image memory 6 through an image data bus 17 by the image processor 1.

On the other hand, screen data for job guidance formed according to the job program of the workstation engine 9 or for display of system status are loaded into the color code memory 8 in the form of color code through the display color code interface 19. Simultaneously, LUT data for color definition of color code which is outputted to the workstation bus 18 are loaded into the LUT memory 12 through the LUT steal circuit 13.

The high speed memory 6 and the color code memory 8 each have a parallel port connected to the image data bus 17 and a high speed serial port for outputting an internal signal of the display controlling section 14. The high speed image memory 6 and the color code memory 8 output image data and color code respectively from the respective high speed serial port according to instructions from the CRT controller 7. The image data density restoring section 10 develops two-dimensionally the image data for each plane of RGB and then performs respective calculations of density of central pixel of RGB and outputs RGB density data. The LUT memory 12 outputs RGB density data according to the color definition of color code. The workstation engine 9 designates display area of color code to the CRT controller 7 through the image data bus 17 in the form of switching data. The switching data is inputted to the selector circuit 11 through the CRT controller 7 and causes the selector circuit 11 to select which is outputted as RGB density data, image data or color code data, and then to output the selected RGB density data to the color display device 15, whereby superimposed images of the dot data and the color code data are displayed on the display screen of the color display device 15.

Operation of the image data density restoring section 10 will be described in connector with FIG. 7.

For example, assume that matrix size is of 5×5 pixels. The matrix A of FIG. 7 is dot data as developed into a matrix of 5×5 pixels. Calculation of density is made by performing weighted addition with weighted central pixels, not conventional addition of dots. Matrix B is considered as weighting factor. Assuming that an element of the matrix A is aij, and an element of the matrix B is bij, the density of the control pixel of the matrix A can be expressed by the following:

$$\sum_{i=0}^{4} \sum_{j=0}^{4} aij \cdot bij$$

Thus the image data density restoring section 10 can convert the dot data into RGB density data.

Figure 8:
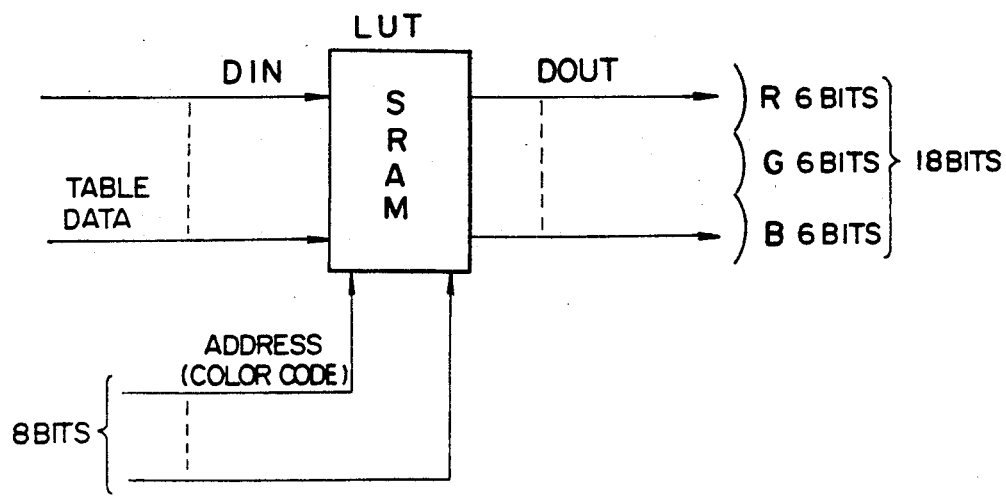
FIG. 8 is a diagram showing an LUT memory.

The structure of the LUT memory 12 will be described in connection with FIG. 8.

In this embodiment, the LUT memory 13 comprises an SRAM of 256×18 bits and is adapted to convert a color code of 8 bits into RGB density data of 18 bits, 6 bits for each of RGB. In loading table data into the LUT memory 13, desired table data are sequentially inputted into the data input terminal DIN for addresses corresponding to respective color codes. Then, when any color code is provided to the LUT memory 12 as an address, RGB density data having a predetermined relationship to the input color code is outputted from the data output terminal DOUT.

Operation for transferring display image data from the color filing device 16 to the color printing device 27 will now be described.

Figure 3:
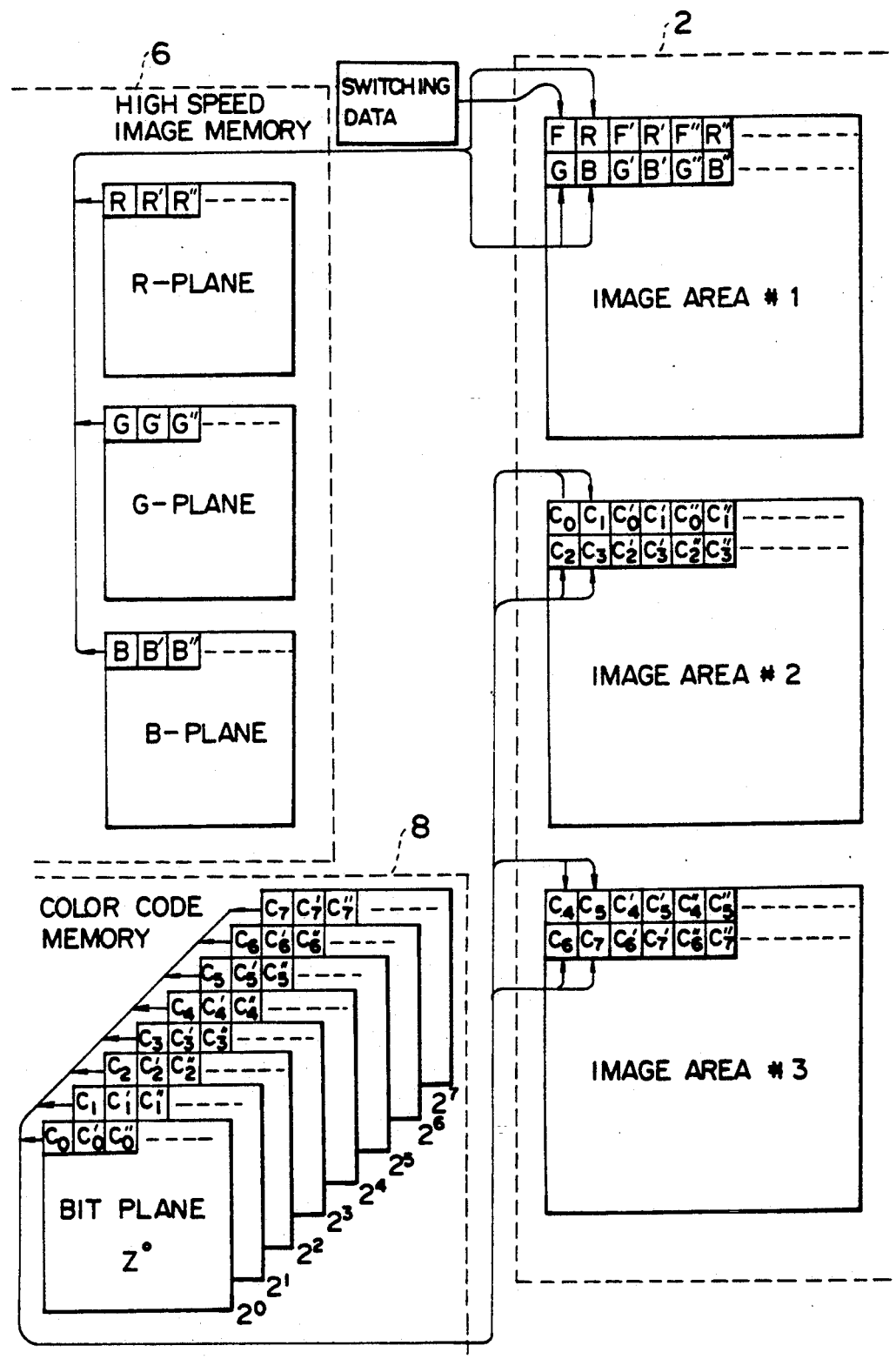
FIG. 3 is a diagram showing a process for superimposing dot data and color code data on an image memory at the side of host.

Prior to transferring display image data, dot data and color code data are written into the image area in the image memory 2 which can be simultaneously accessible with double line density, as shown in FIG. 3. Assume that dot data for three planes of RGB are stored in the high speed image memory 6 with a line density of 200 DPI, and dot data for eight bit planes $2^0 \sim 2^7$ are stored in the color code memory 8 with a line density of 200 DPI. Furthermore, assume that the image memory 2 has image areas #1, #2 and #3 for three planes of RGB as used to store conventional image with a line density of 400 DPI. Data in three planes of RGB are read from the high speed image memory 6 by means of the image processor dot by dot, and then written into the image area #1 in a divided unit of 200 DPI (each unit for a block of 2×2 pixels in 400 DPI). Simultaneously, display area switching data (selecting flags each indicating which is selected dot data or color code data for the respective pixel in 200 DPI) designated by a host (workstation engine) are written into the image area #1. Subsequently, color code data for eight bit planes $2°\sim 2''$ are read from the color code memory 8 by means of the image processor, and then written into the image areas #2 and #3 in a divided unit of 200 DPI. Thus, the dot data and color code data stored in the image memory 2 can be considered to be stored in the image areas #1, #2 and #3 as identical pixel data in a divided unit of 200 DPI. As a result, the dot data and color code data have been stored as data of 4 bits for one pixel for each of three planes of RGB in 200 DPI. Data of this image memory are read out with a line density of 400 DPI for a conventional image, and then transferred to a printer through the printer interface. The transferred data are written into the printer image memory 21 of the printer in the same form as stored in the image memory 2.

When a command of hard copy is provided to the image processor 1 from the workstation engine 9, the image processor 1 loads LUT data into the image memory 2 from the LUT steal circuit 13. Subsequently, the color printer I/O controlling section 5 reads out LUT data from the image memory 2 and then transfer them to the color printing device 27 through the color printer interface. When the color printing device 27 receives LUT data, it loads the LUT data into the LUT memory 22 of the printer through the color printer interface section 20. After LUT data were transferred to the printer, the image processor 1 reads out image data, switching data and color codes successively from the display controlling section 14 and then writes the three data into the image memory 2 in the form of data as described above. Then, the color printer I/O controlling section 5 successively reads data out of the image memory 2 and then transfers them to the color printing device 27 through the color printer interface, and the color printer interface section 20 writes the received data into the printer image memory 21.

Printing operation of display data in the color printing device 27 will be described below.

Data read out from the printer image memory 21 are separated into three data, i.e., image data, switching data and color code data by means of the color code image data separating circuit 23. The color code is converted into RGB density data via the LUT memory 22. The image data are converted into RGB density data by the image data density restoring section 24. Incidentally, the LUT memory 12 and the LUT memory 22 have the same function, and also the image data density restoring section 10 and the image data density restoring section 24 have the same function. The selector 25 switchingly selects RGB density data derived from color code or those derived from image data according to the switching data and then sends the selected RGB density data to the color printer printing section 26, whereby display data are printed.

Figure 4:
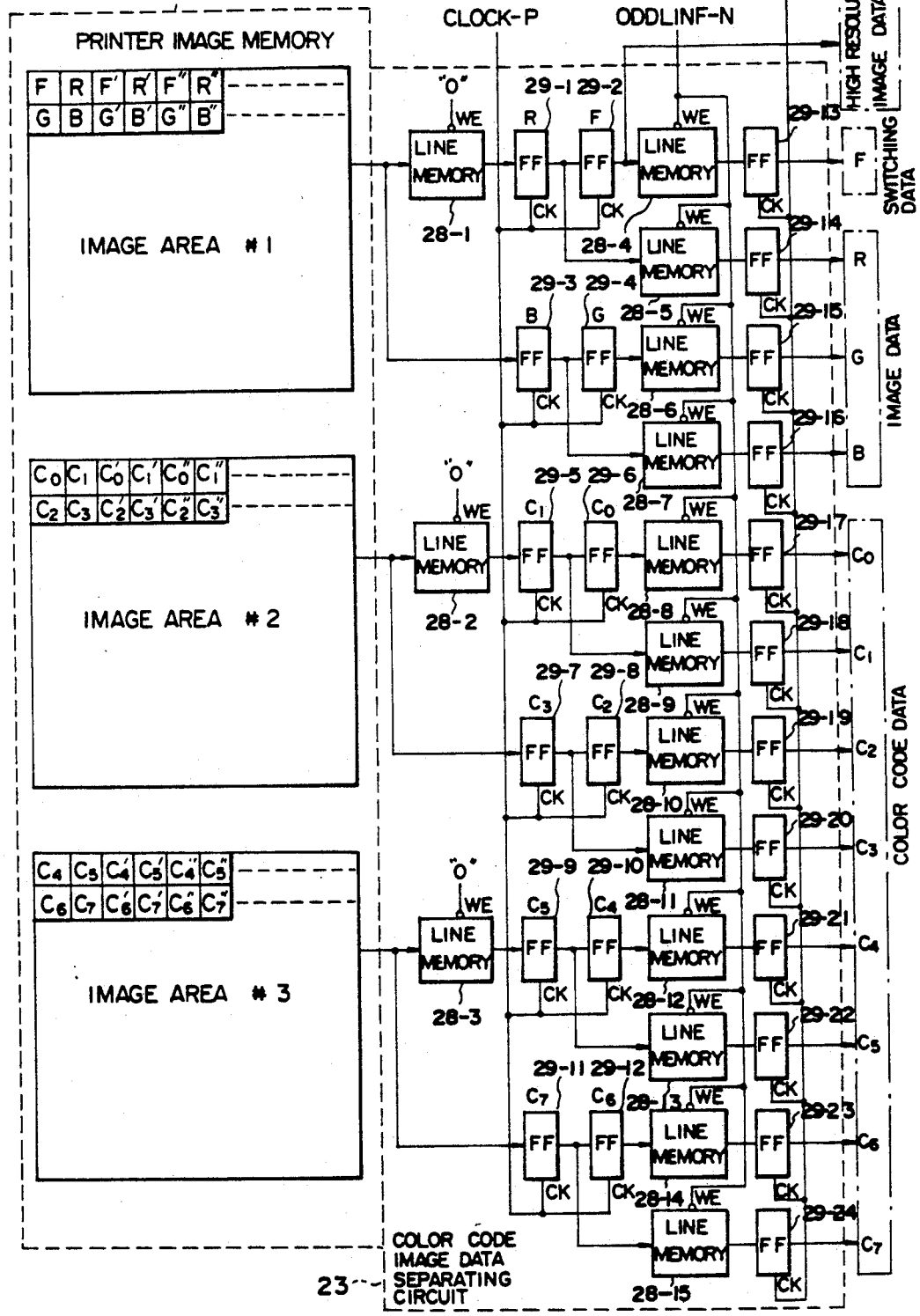
FIG. 4 is a circuit diagram showing a configuration of a color code image data separating circuit in a printer.

An example of the color code image data separating circuit 23 will be described in connection with FIG. 4.

Figure 5:
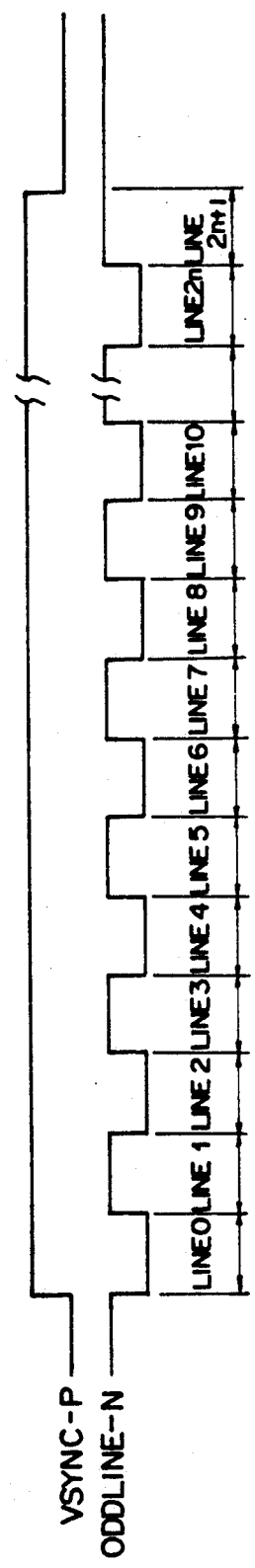
FIGS. 5 and 6 are timing charts showing timing signals used in the circuit of FIG. 4.
Figure 6:
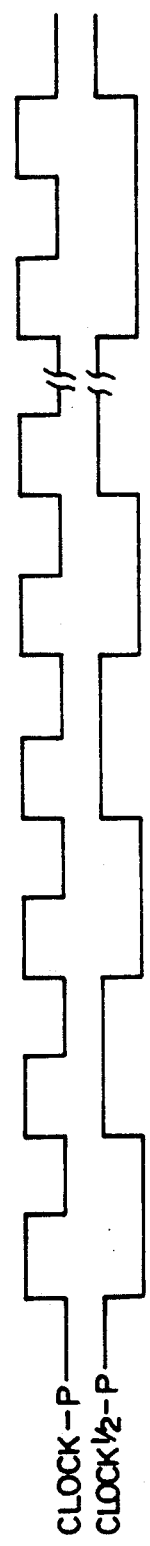

The image areas #1, #2 and #3 of the printer image memory 21 have data stored therein in the same form as those stored in the image memory 2 of FIG. 3 described above. In printing operation, data of the image areas #1, #2 and #3 are simultaneously read out from the printer image memory 21 and then are inputted to the color code image data separating circuit 23. The inputted data in lines in the line memories 28-1 to 28-3 and further developed into 2×2 pixels in the flip-flops (hereinafter referred to as FFs) 29-1 to 29-12. The manner of development of the image data, switching data and color code data into FFs is as shown in FIG. 4. Then, data developed into FF are sampled for every even lines by the line memories 28-4 to 28-15. Further, the sampled data are sampled for every two pixels by FF 29-13 to 29-24 to output image data, switching data and color code data in a line density of 200 DPI. FIGS. 5 and 6 show timing relationship among ODDLINE-N, CLOCK-P and CLOCK½-P of timing signals used in the color code image data separating circuit 23.

As shown in FIG. 5 together with vertically synchorizing signal VSYNC-P, signal ODDLINE-N is at low level for even lines, at high level for odd lines and at high level for the other period. Furthermore, as shown in FIG. 6, signal CLOCK½-P is a signal which is produced by dividing in frequency a signal CLOCK-P by a factor of 2.

Figure 2:
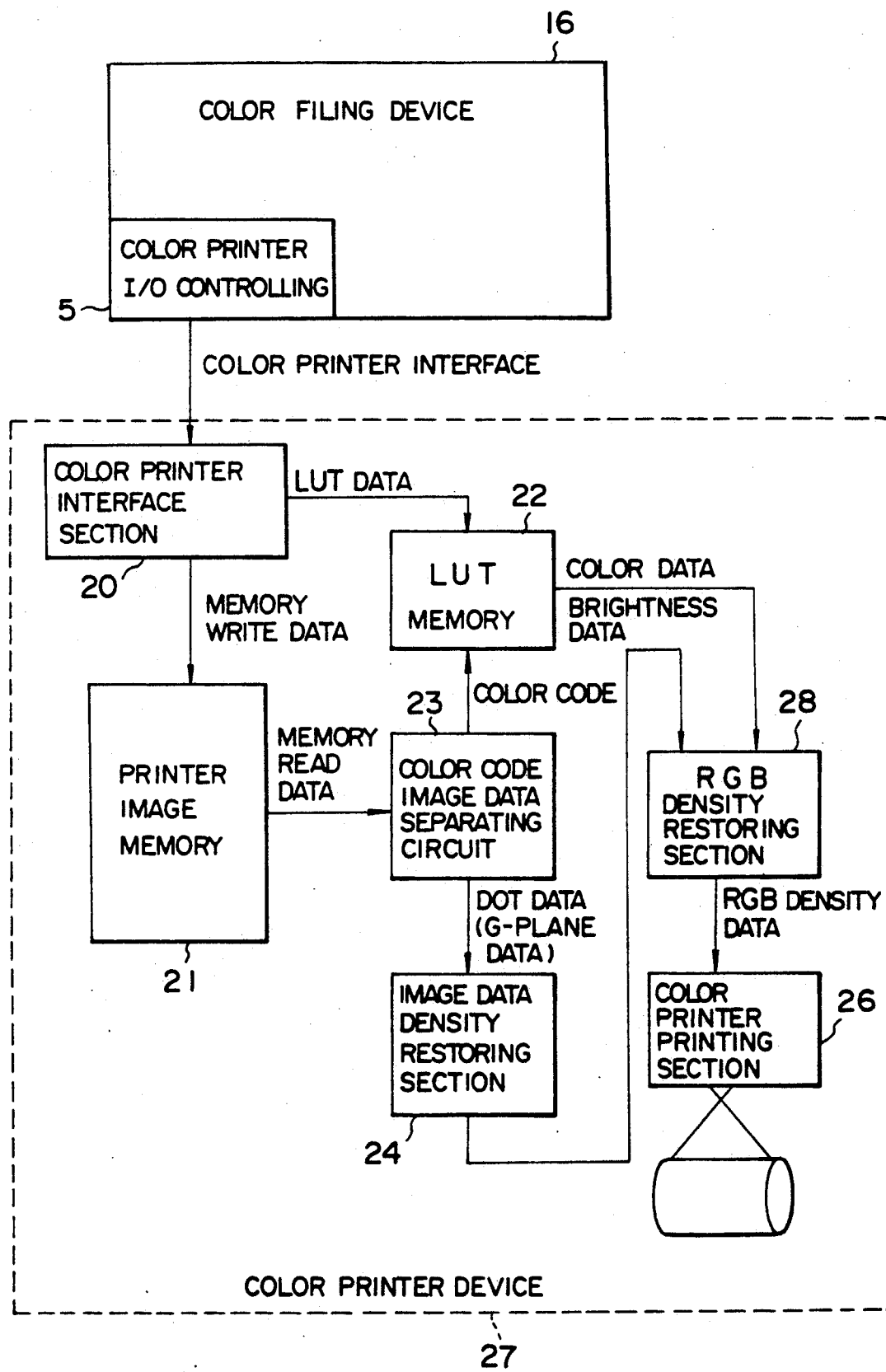
FIG. 2 is a block diagram showing another embodiment of this invention.

Another embodiment of this invention will be described in connection with FIG. 2.

Figure 9:
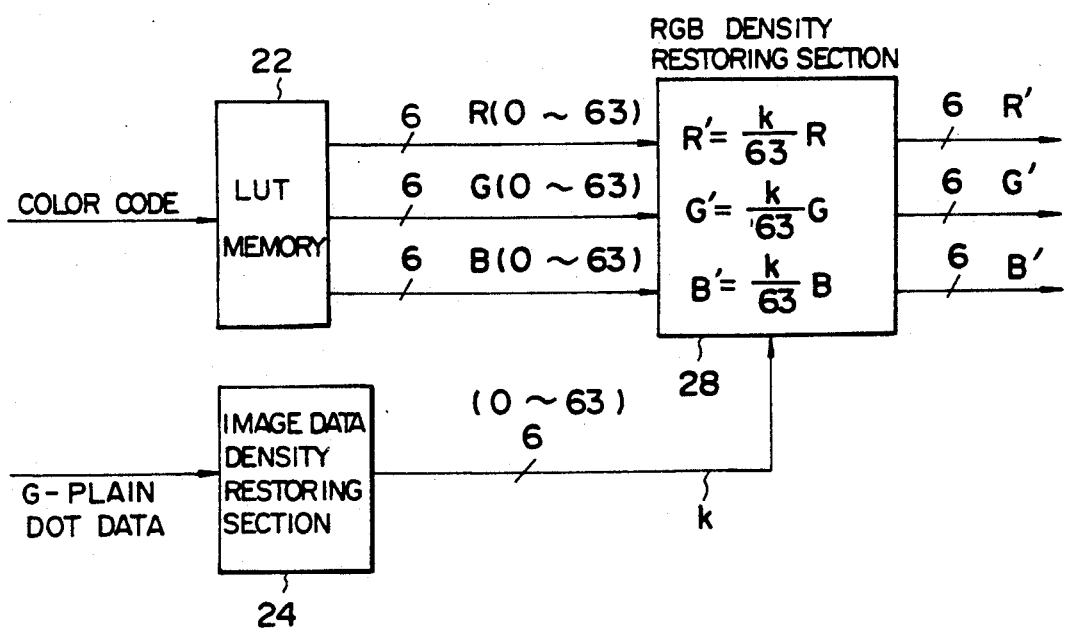
FIG. 9 is a diagram for explaining operation of the embodiment of FIG. 2.

The structure of the hardware of a color filing device 16 is the same as shown in FIG. 1. However, the image processing is different. As shown in FIG. 3, data in the image area #1 are different from the data as in FIG. 1. Namely, brightness data are stored in the G plane of another area of the image memory 2 in a line density of 400 DPI as monochromatic data. The brightness data are transferred to the image area #1 in the same line density. Color code in the color code memory 8 is provided as data for coloring the monochromatic image according to the program of the workstation engine 9. Although the subsequent operation of the color filing device 16 is the same as that in FIG. 1, processing for density restoring in the color printing device 27 is different. Namely, the output of the LUT memory 22 is color data, and the input to the image density restoring section 24 is only data for G-plane, therefore, the output from the image density restoring section 24 is only density data for G-plane which are brightness data. As shown in FIG. 9, the RGB density restoring section 28 modulates color in amplitude data (multivalued data of 6 bits for each of RGB in this embodiment) equally for each of RGB based on the brightness data (6 bits of G) and then outputs RGB density data to the color printing section 26. If data value of G plane, i.e., factor for brightness modilation is K and data obtained by brightness modulation of RGB are R', G' and B', the following equations are provided:

$$R' = (K/63)R$$

$$G' = (K/63)G$$

$$B' = (K/63)B$$

It goes without saying that in the embodiments as described above printing of only normal dot image or only color code data can be performed. Storing position of FRGB and C0~C7 in each image area #1 to #3 as described in connection with FIG. 3 are not limited to those shown. It is important that separation of the combined data is performed at the side of the printing device according to the storing positions of each data at the display controlling device. The number of bits of the color code of FIG. 3 is not limited to 8 bits. Namely, if the number is less than 8 bits, there would only be unused portions of the image area, and if the number is larger than 8 bits, a divided unit larger than 2×2 may be used.

The following functional advantages can be obtained from this invention.

Combining of a color image expressed by dot data with a color image expressed by color code data can be carried out by host or printer alone.

Moreover, means for storing and transmitting both images can be common to these for normal image. Therefore, it will be possible to reduce the memory capacity required and improve the transmitting speed.

Color image processing apparatus and color printing apparatus can be realized which have color editing function such as coloring, color conversion, etc., by processing LUT data.

What is claimed is:

1. A method of superimposing and displaying a color image expressed by color code data and a color image expressed by three primary color dot data, comprising the steps of:
    converting said color code data into three primary color density data while converting said three primary color dot data into density data which are in the same form as said three primary color density data; and
    selectively displaying one of the two data for each pixel on a display screen.

2. A method of simultaneously transferring a color image expressed by color code data and a color image expressed by three primary color dot data to a device of destination, comprising the steps of:
    providing an image memory for storing a color image having a size larger than said color image;
    storing multi-bit data corresponding to each pixel of said color code data and dot data as a plurality of pixels in said image memory;
    feeding data stored in said image memory to said device of destination as dot data; and
    separating said color code data and said three primary color dot data from each other in said device of destination.

3. A method as defined in claim 2 wherein said multi-bit data corresponding to said each pixel include selecting data to indicate which of said color code data or said three primary color dot data should be selected for the pixel.

4. A color image processing apparatus for processing and displaying color images, comprising:
- a first image memory means for storing a color image as three primary color dot data;
- a second image memory means for storing a color image as color code data;
- means for calculating density data for each of three primary colors on the basis of dot density of the three primary dot data stored in said first image memory means;
- means for converting the color code data stored in said second image memory means into density data for each of three primary colors; and
- means for selecting and feeding either of the two density data for each of three primary colors to a color displaying device.

5. A color image processing apparatus as defined in claim 4, further comprising a third image memory means for storing three primary color dot data stored in said first image memory means and color code data stored in said second image memory means together with selecting data to indicate which of said three primary color dot data or said color code data should be selected for each pixel, and means for reading out data stored in said third image memory means as dot data and sending them to a color printing device.

6. A color printing device as connected to a color image processing apparatus as defined in claim 5, comprising:
- a printer image memory means for receiving and storing the data stored in said third image memory means as three primary color dot data;
- means for separating the data stored in said printer image memory means into dot data, color code data and selecting data;
- means for calculating density data for each of three primary colors on the basis of dot density of the separated dot data;
- means for converting the separated color code data into density data for each of three primary colors; and
- means for selecting and outputting either of said two density data for each of three primary colors on the basis of the separated selecting data.

7. A color image processing apparatus for processing and displaying color images, comprising:
- a first image memory means for storing brightness information of a color image as dot data;
- a second image memory means for storing color information of a color image as color code data;
- means for calculating brightness data on the basis of dot density of the dot data stored in said first image memory means;
- means for converting the color code data stored in said second image memory means into color data; and
- means for converting said brightness data and said color data into density data for each of three primary colors and feeding them to a color displaying device.

8. A color image processing apparatus as defined in claim 7, further comprising a third image memory means for storing the dot data stored in said first image memory means and the color code data stored in said second image memory means in association with each other, and means for reading out data stored in said third image memory means as dot data and sending them to a color printing device.

9. A color printing device as connected to a color image processing apparatus as defined in claim 8, comprising:
- a printer image memory means for receiving and storing the data stored in said third image memory means as dot data;
- means for separating the data stored in said printer image memory means into dot data and color code data;
- means for calculating brightness data on the basis of dot density of the separated dot data;
- means for converting the separated color code data into color data; and
- means for converting said brightness data and said color data into density data for each of three primary colors and feeding them to a color printing section.

* * * * *